H. Wells,
Saw-Mill Head-Block.
N°20,910.
Patented July 13, 1858.
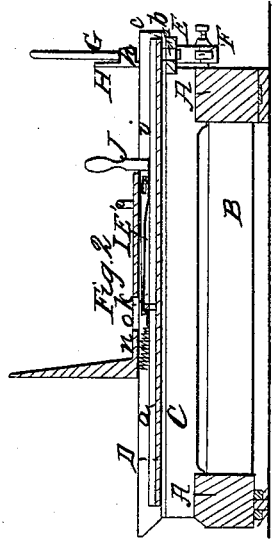
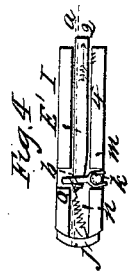
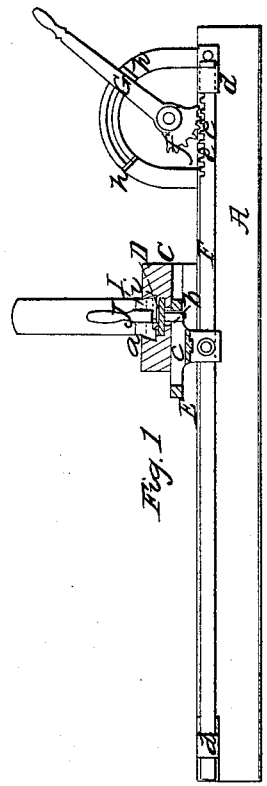
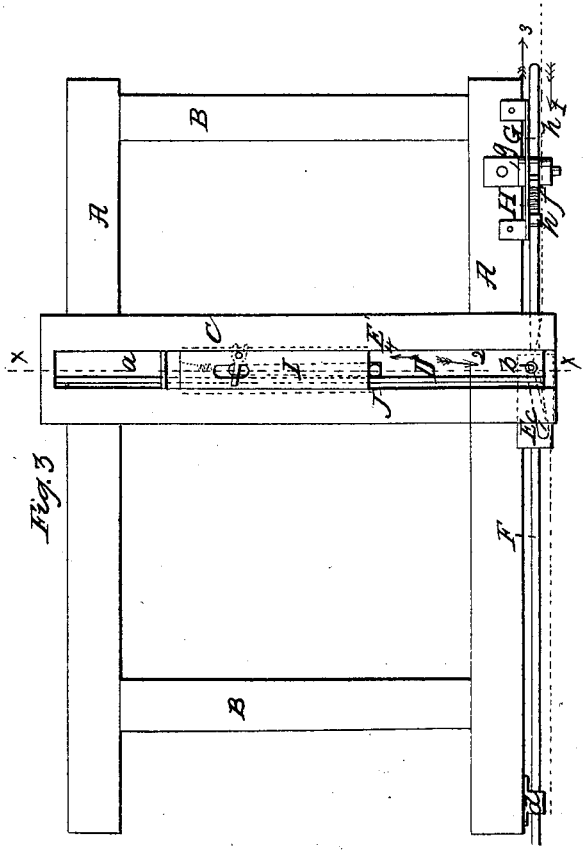

UNITED STATES PATENT OFFICE.

H. WELLS, OF FLORANCE, MASSACHUSETTS.

SAWMILL-BLOCK.

Specification of Letters Patent No. 20,910, dated July 13, 1858.

*To all whom it may concern:*

Be it known that I, HIRAM WELLS, of Florance, in the county of Hampshire and State of Massachusetts, have invented a new and Improved Self-Setting Sawmill-Block; and I do hereby declare that the following is a full, clear, and exact description of the same, reference being had to the annexed drawings, making a part of this specification, in which—

Figure 1, is a side view of a sawmill carriage with my invention applied to it. Fig. 2, is a vertical section of the block and carriage, taken in the line $x$, $x$, Fig. 3. Fig. 3, is a plan or top view of ditto. Fig. 4, is a detached inverted plan of the mechanism which is attached to the under side of the dog bar.

Similar letters of reference indicate corresponding parts in the several figures.

This invention relates to an improvement in sawmill blocks for which Letters Patent were granted to me June 9th, 1857. In this patent of the above date the dogs of both the head and tail blocks were operated simultaneously by means of a rack bar connected to the dog bars by means of levers, racks, pawls, etc., arranged so as to form a comparatively complicated device.

The object of the within described invention is to attain the same ends by a simpler arrangement of parts, less liable to get out of repair and more economical to construct, as hereinafter shown and described.

To enable those skilled in the art to fully understand and construct my invention I will proceed to describe it.

A, A, represent the two parallel longitudinal timbers of a sawmill carriage and B, B, are traverse pieces, the carriage being constructed in the usual way.

C, is a block placed transversely on the carriage and secured to it by any proper means. The block C, is grooved longitudinally its whole length and a sliding bar D, is fitted therein and allowed to work freely back and forth. On the upper surface of the bar D, a longitudinal ledge or rib $a$, is formed, said ledge or rib extending the whole length of the bar D, as shown clearly in Fig. 3. One end of the bar D, has a pin $b$, projecting vertically down from its under side. This pin $b$, fits in an oblique slot $c$, which is made in a horizontal plate E, attached to a bar F, said bar being fitted in suitable guides $d$, $d$, attached to the side of one of the bars A, of the carriage, the bar F, being allowed to slide freely in its bearings. The bar F, has a rack $e$, formed on its upper edge at one end and a segment $f$, gears into said rack, the segment being at the lower end of a lever G, which is pivoted to a small upright projection $g$, on the carriage. The movement of lever G, as regards the length of its vibration is controlled by stops $h$, $h$, on a curved plate H, attached to the carriage. One of the stops $h$, may be made adjustable.

I, represents the dog bar which is fitted in a dove tail groove $i$, in the block C. The usual dog is attached to this bar I. In the under side of the bar I, a longitudinal groove $j$, is made and a small lever $k$, is fitted transversely in the under side of the bar I, said lever having a recess $l$, made in it to receive the ledge or rib $a$, on the bar D. The lever $k$, works in a fulcrum pin $m$, and a spiral spring $n$, is attached to it, said spring having a tendency to keep the lever $k$, out of a right angular position relatively with the rib or ledge $a$, and cause said lever to grasp the rib or ledge, in consequence of the edges of the recess binding against the sides of the same. This will be understood by referring to Fig. 4, in which the rib or ledge or rather its position relatively with the lever $k$, is shown in red.

In the groove $j$, in the bar I, a rod E', is placed. This rod has a lip $o$, formed at its inner end and projecting downward over the lever $k$. The outer end of the rod projects upward at the end of the dog bar I, and serves as a handle.

There are two blocks C, attached to the carriage, one at each end. They are both constructed precisely alike and the bars D, of both are connected with the bar F.

By shoving the upper end of the lever G, in the direction indicated by arrow $l$, the bar D, will be moved, through the medium of bar F, and slotted plate E, in the direction of arrow 2, see Figs. 3 and 4, the position of lever $k$, permitting such movement without affecting the dog bar I. But if the upper end of lever G, be moved in the direction indicated by arrow 3, the bar D, will be moved as indicated by arrow 4, and the dog bar I, will be moved with it, as the lever $k$, owing to its position as previously described serves as a clutch, the rib or ledge $a$, binding in the recess $l$, of said lever. The log therefore which is secured by a dog to bar I, at each movement of the lever G, in the direction indicated by arrow 3, will be fed laterally to the saw so that stuff may be sawed from it of the desired thickness, the thickness depending on the extent of the movement of lever G, which movement may be varied as desired by adjusting one of the stops h. It will be understod that the log is moved bodily toward the saw as both ends of the log are moved simultaneously the dog bars of both blocks being connected by the same mechanism with the bar F. One block is only represented in the drawings, one being sufficient as both are precisely alike in every respect. The lever G, may be moved automatically at the termination of each stroke of the carriage by any simple means. The carriage is operated so that the log is fed longitudinally to the saw by the usual arrangement of means. The dog bar I, may be drawn backward or in a direction opposite to that in which it was fed to the saw, by merely grasping the handle J, the lip o, of said rod freeing the lever k, from the rib a, of the bar D.

Having thus described my invention what I claim as new and desire to secure by Letters Patent, is,

Operating the dog bar I, of the block C, by means of the lever k, fitted in the under side of said bar, the ribbed plate D, connected with the bar F, by the obliquely slotted plate E, and pin b, the whole being arranged and applied to the carriage substantially as and for the purpose set forth.

HIRAM WELLS.

Witnesses:
D. C. TENNEY,
HIRAM STEBBINS.